April 3, 1934.                H. F. FELLOWS                1,953,705
                            TRAILER FIFTH WHEEL
                        Original Filed Dec. 14, 1931    2 Sheets-Sheet 1
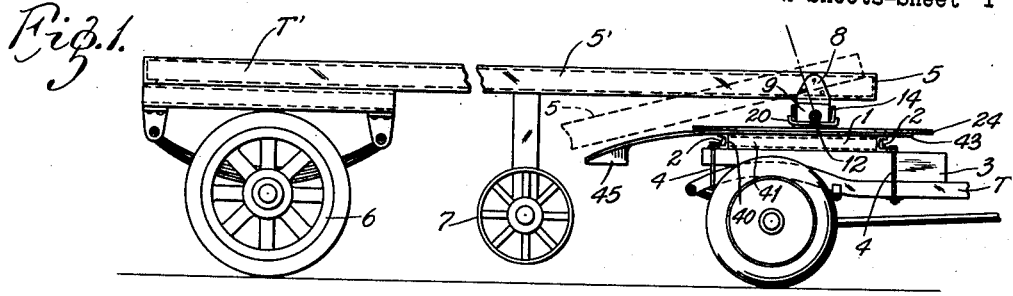
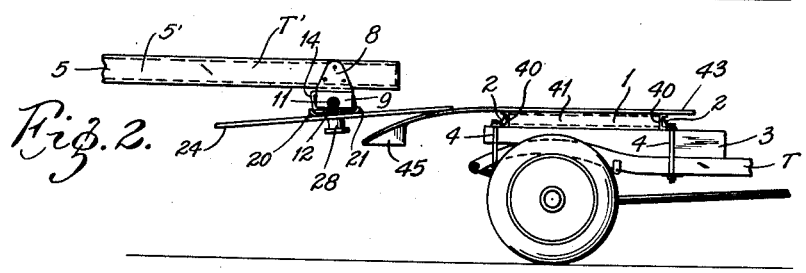
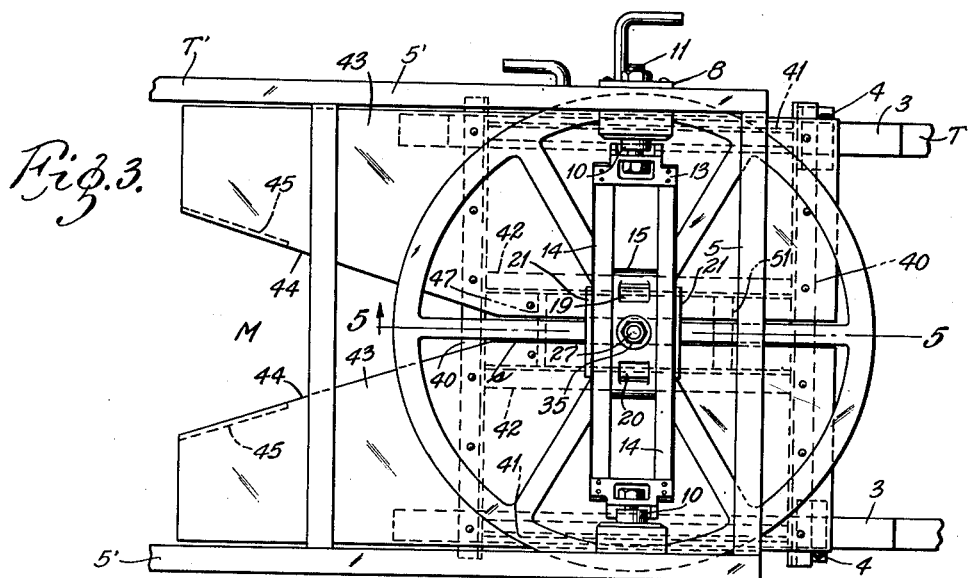
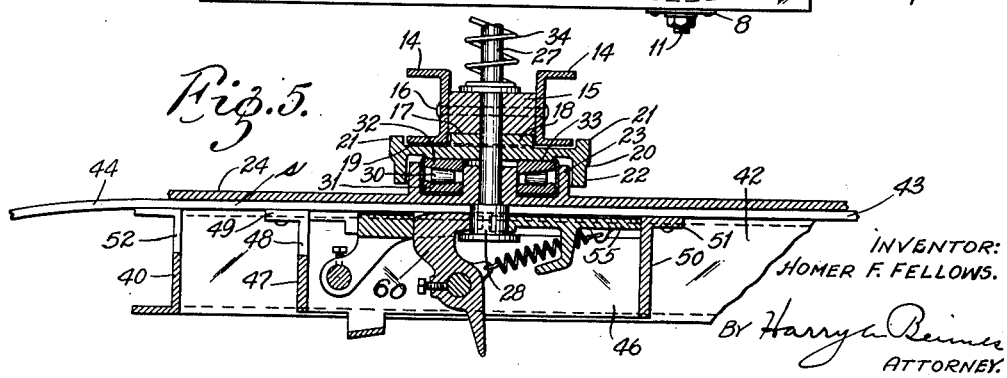
INVENTOR:
HOMER F. FELLOWS.
By Harry L. Reimer
ATTORNEY.

April 3, 1934. H. F. FELLOWS 1,953,705
TRAILER FIFTH WHEEL
Original Filed Dec. 14, 1931 2 Sheets-Sheet 2
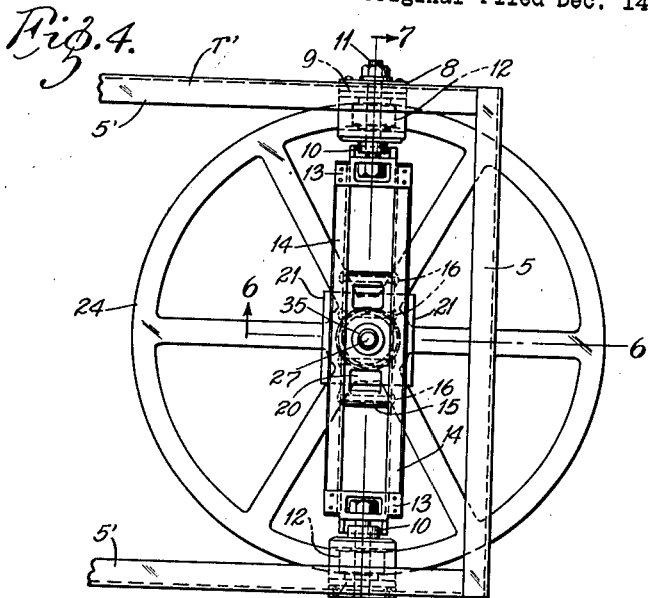
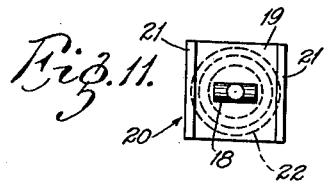
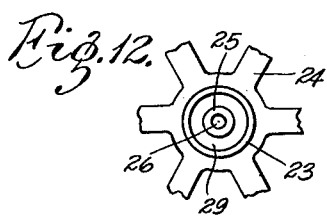
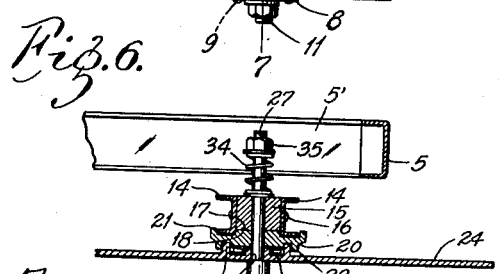
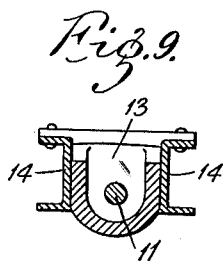
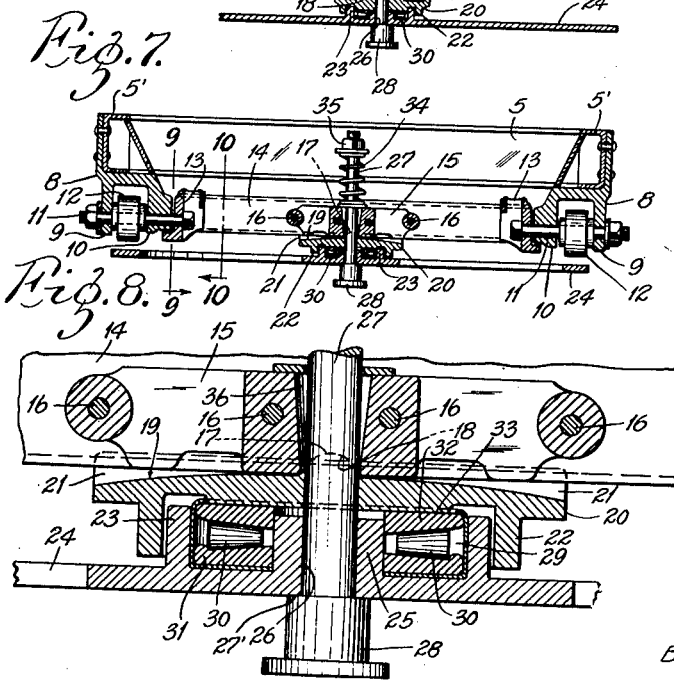
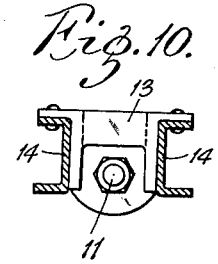
INVENTOR:
HOMER F. FELLOWS.
BY Harry L. Benner
ATTORNEY.

Patented Apr. 3, 1934

1,953,705

UNITED STATES PATENT OFFICE 1,953,705

TRAILER FIFTH WHEEL

Homer F. Fellows, Springfield, Mo.

Original application December 14, 1931, Serial No. 580,791. Divided and this application April 24, 1933, Serial No. 667,590

6 Claims. (Cl. 280—33.1)

My invention has relation to improvements in motor vehicle trailer fifth wheel, and it consists of the novel features more fully set forth in the specification and pointed out in the claims.

Motor vehicle trailers have lately come into widespread use on account of the economy of transportation involved, since a single truck may be used for hauling a number of trailers, the truck being released while the trailer is either loading or unloading, the power unit of the transportation train being at all times employed instead of standing idly by, as is the case when the power unit is embodied in the carrier (truck body) itself. In order to facilitate the coupling and uncoupling of the truck and trailer, automatic couplings of various types are employed. However, the majority of the couplings now in use are complicated and cumbersome and, at the same time, do not possess the flexibility essential to the smooth operation of the coupled parts.

In the present invention I have sought to simplify the coupling construction, at the same time embodying in it the means of providing a flexible connection between truck and trailer. Among the advantages of the present invention are the complete separation of the coupling mechanism (except the king-pin) from the fifth wheel, the former being embodied in a self-contained unit that may be attached to any truck (described and claimed in my co-pending application Serial No. 580,791, filed December 14, 1931, of which this application is a division) while the latter is carried on the front of the trailer frame. The trailer is thus rotatably mounted upon the truck, the plane of rotation being the plane of separation between trailer and truck so as to facilitate turning of the truck and trailer assembly. The trailer is angularly movable in a vertical longitudinal plane by virtue of the fifth wheel being pivotally connected to the trailer frame, and means for permitting lateral tilting of the trailer frame is also embodied in the fifth wheel construction. The advantages of the features just pointed out are obvious. For instance, the free angular movement of the trailer with respect to the truck permits drawing the trailer over ground on a different level than that on which the truck is on, as when the truck and trailer assembly crosses a ditch. The lateral tilting permits of movement by the trailer frame due to uneven terrain without imposing stresses on the anti-friction center bearing, or king-pin.

It is a further object of the invention to simplify fifth wheel and coupling construction by incorporating all the flexibility of the connection in the trailer—the turning movement, and both longitudinal and latitudinal tilting are effected in the fifth wheel construction carried by the trailer. All the coupling mechanism, except the king-pin, is embodied in the coupling platform carried by the truck. This complete separation of the elements of flexibility from the coupling elements, obviously, makes for simplicity and certainty of operation.

That I have accomplished my object of simplicity in construction should be further apparent from the fact that only three moving parts are comprised in the coupling mechanism, aside from the king-pin carried by the fifth wheel on the trailer. These advantages, as well as others inherent in the invention, will be better apparent from a detailed description thereof in connection with the accompanying drawings, in which:

Figure 1 is a side elevation of a truck and trailer (with parts broken away) embodying my improved fifth wheel and coupling, which are shown in assembled position: Fig. 2 is a side elevation of the rear end of a truck and the front end of a trailer which are about to be coupled together; Fig. 3 is an enlarged top plan of the trailer fifth wheel connected to the coupling mechanism mounted on the truck; Fig. 4 is an enlarged top plan of the fifth wheel, which carries the king-pin, disconnected from the truck; Fig. 5 is a vertical longitudinal section taken on the line 5—5 of Fig. 3; Fig. 6 is a vertical cross-sectional detail taken on the line 6—6 of Fig. 4; Fig. 7 is also a vertical cross-sectional detail taken on the line 7—7 (at right angles to the section of Fig. 6) of Fig. 4; Fig. 8 is a cross-sectional enlargement of the center bearing shown in Fig. 7 with parts broken away; Fig. 9 is a vertical cross-sectional detail taken on the line 9—9 of Fig. 7; Fig. 10 is a vertical cross-sectional detail taken on the line 10—10 of Fig. 7; Fig. 11 is a top plan of the upper housing member for the fifth wheel anti-friction bearing; and Fig. 12 is a top plan of the hub of the fifth wheel ring which serves as the lower housing member for the anti-friction bearing.

Referring to the drawings, T represents a truck, to which is coupled a trailer T' by means of my improved fifth wheel and coupling, the fifth wheel and king-pin being carried at the forward end of the trailer T', and the coupling mechanism being mounted in a platform frame 1 secured to the frame of truck T by means of suitable clamps 2, 2, sills 3, 3 and bolts 4, 4. Since the clamps 2 and sills 3 merely facilitate the securing of the platform frame 1 to the truck and do not constitute a part of the invention itself they will not be further alluded to. The invention will best be understood by the following detailed description of the fifth wheel construction.

The trailer T' is of the usual construction, comprising a vehicle frame 5 supported by rear wheels 6 and having, under the forward end, prop wheels 7 for supporting the forward end of the trailer when it is disconnected from the truck for loading, or unloading, purposes. A pair of brackets 8, 8 are secured to the outer faces of frame members 5', 5', said brackets each having spaced bearing elements 9, 10 beneath each side member 5'. A pintle 11 is mounted in the bearings 9 and 10 and carries a freely rotatable roller 12 disposed in the space between the bearings. Obviously, both side members 5', 5' carry similar brackets 8, 8, and, since they are identical, a description of one will serve. The inner ends of the oppositely disposed pintles 11, 11 traverse castings 13, 13, which serve to connect, in spaced relation, channels 14, 14, said channels and castings together constituting a unitary yoke structure which is capable of rocking on a transverse axis, as defined by the pintles 11, 11. A bearing block 15 is secured at the center between the channels 14, 14 by a plurality of rivets 16, 16, the lower surface of the bearing block being provided with a circular depression 17 to receive the correspondingly shaped rib 18 formed on the upper surface 19 of anti-friction bearing housing member 20. Housing member 20 is provided with opposite upwardly projecting flanges 21, 21 adapted to embrace the lower flanges of channels 14, 14, and said housing member 20 is also provided with a depending annular flange 22 for enveloping upwardly projecting annular flange 23 formed at the center of fifth wheel ring 24. A boss 25 is concentrically formed with the flange 23 and is provided with an opening 26, through which the reduced portion 27 of king-pin 28 passes. Within the annular channel 29, formed between boss 25 and flange 23, is an anti-friction bearing (roller bearing) 30 the lower raceway 31 thereof being seated in the channel 29; the upper raceway 32 is in frictional engagement with the inner face 33 of housing member 20 supported on said upper raceway 32. The fifth wheel ring 24, housing 20 and bearing block 15 are held in intimate relation by means of a coiled spring 34 around the upper part of king-pin 28, the tension on said spring being adjustable by means of a nut 35, screw threaded over the upper end of the king-pin. The bearing block 15 is traversed by an opening 36, which tapers outwardly toward the top so as to permit the bearing block (and, of course, the entire trailer frame) to rock laterally on the rib 18 of housing member 20. Obviously, clearance must also be provided between the yoke and the upper surface 19 of member 20. This is accomplished by crowning the surface 19 slightly, as shown (Fig. 8). The shoulder 27', formed between the portions 27 and 28 of the king-pin, engages the under side of the fifth wheel ring and thus maintains this ring in intimate contact with the housing member 20, so that the enlarged portion 28 of the king-pin will always extend downwardly beyond the ring 24 for engagement with the coupling mechanism mounted on the truck.

It is apparent that the rotation of the yoke 13, 14 in bearings 9, 10 permits of tilting of trailer T' relative to the truck T without imposing any strains on the king-pin 28, which at all times remains perpendicular to the fifth wheel base 24.

The platform frame 1 comprises transverse channels 40, 40, between which extend longitudinally disposed channels 41, 41 and 42, 42, between which latter pair of channels the coupling mechanism is mounted. A platform comprising similar sections 43, 43 is secured (by rivets or otherwise) over the channels comprising the frame 1, said sections 43, 43 being in spaced relation and having diverging forward edges 44, 44, at the outer ends of which are downwardly turned flanges 45, 45 to facilitate the entry of king-pin 28 during the act of coupling the trailer and truck. The triangular space M between plates 43, 43 serving to guide the king-pin 28 into slot s between the plates. An open box 46 is disposed between channels 42, 42, said box having its end 47 (which is adjacent to the flaring mouth M of the platform) provided with a recess 48, on each side of which flanges 49, 49 are formed contiguous to the upper edge of the box whereby it may be riveted to platform sections 43, 43. The opposite end 50 of the box is also provided with a flange 51 on its upper edge, which is riveted to sections 43, 43. It will be observed that the rear frame channel 40 is also provided with a recess 52 of the same width as the flaring mouth at this point to provide a passage for the king-pin 28, and entry of said king-pin into the box 46 for engagement with the coupling members therein, as will be more fully pointed out hereinafter.

After the king-pin 28 has entered sufficiently into the slot s it engages the jaw plate 55 and the locking jaw 60 is released to cooperate with the plate 55 to lock the king-pin in place. This locking jaw mechanism has been fully described in my application above referred to and requires no description in the present application.

When the truck and trailer are being drawn over uneven terrain, such as when operations are carried out on the farm, or for hauling materials used in construction work, the free cradling action of the yoke, comprising members 13, 13 and 14, 14 permits of a wide vertical angular movement between trailer and truck. This permits the trailer to be pulled over gulleys and ditches and other places impassable to truck and trailer combinations which do not possess such flexibility in the coupling. Also, the lateral tilting of the trailer frame is provided for by the fulcrum support of the yoke on the housing member 20. Of course, this lateral tilting is limited by the engagement of either roller 12 with the fifth wheel ring 24. The anti-friction center bearing 30 permits of smooth and easy turning operation of truck and trailer and the location of the plane upon which the turning is effected, above and clear of the truck T provides a wide turning angle to further facilitate the operations of the truck and trailer combination. In many of the couplings now in use the plane upon which turning is effected is below the supporting platform for the trailer, hence the turning angle is limited by obstructions. The dotted position indicated in Fig. 1 shows that even when the trailer is inclined a considerable extent with respect to the truck it is still clear of the truck supporting platform and the bearing remains in a horizontal plane so that turning may still be effected.

It is, therefore, apparent that, in addition to the simplicity of construction, my improved fifth wheel is operable in almost any position truck and trailer may assume in practice, and the coupling possesses flexibility of movement to a marked degree.

Having described my invention, I claim:

1. In combination with a motor vehicle having a trailer supporting platform and a trailer adapted for connection therewith, said trailer comprising a frame, a fifth wheel assembly carried at the front end of the trailer frame, said assembly comprising a yoke mounted on the trailer frame for rotation on an axis transverse to said frame, an anti-friction bearing adapted to rest on said platform, and a fulcrum connection between the yoke and anti-friction bearing for permitting lateral rocking of the yoke and trailer frame on the anti-friction bearing.

2. In combination with a motor vehicle having a trailer supporting platform and a trailer adapted for connection therewith, said trailer comprising a frame, a fifth wheel assembly carried at the front end of the trailer frame, said assembly comprising a yoke mounted on the trailer frame for rotation on an axis transverse to said frame, a fifth wheel ring adapted to rest on the supporting platform, a center bearing member between the yoke and fifth wheel ring for relative rotation of said yoke and ring in a horizontal plane, and a fulcrum connection between the yoke and bearing member to permit lateral oscillation of yoke and trailer frame.

3. In combination with a motor vehicle and a trailer adapted for connection therewith, said trailer having a fifth wheel assembly comprising a center bearing, a member carrying the center bearing, said member being mounted for rotation on the trailer frame on a horizontal axis transverse to said frame, a flexible connection between said member and center bearing permitting oscillation of said member about an axis at right angles to said rotation axis, and means for connecting the fifth wheel assembly to the motor vehicle.

4. In combination with a motor vehicle and a trailer adapted for connection therewith, said trailer having a fifth wheel assembly comprising a center bearing, a member carrying the center bearing, said member being mounted for rotation on the trailer frame on a horizontal axis transverse to said frame, a flexible connection between said member and center bearing permitting oscillation of said member about an axis at right angles to said rotation axis, and a king-pin projecting from said center bearing, said king-pin being permanently disposed perpendicular to said center bearing.

5. In combination with a motor vehicle having a trailer supporting platform and a trailer adapted for connection therewith, said trailer comprising a frame, a fifth wheel assembly carried at the front end of the trailer frame, said assembly comprising a yoke mounted on the trailer frame for rotation on an axis transverse to said frame, a fifth wheel ring adapted to rest on the supporting platform, a center bearing member between the yoke and fifth wheel ring for relative rotation of said yoke and ring in a horizontal plane.

6. In combination with a motor vehicle and a trailer adapted for connection therewith, said trailer having a fifth wheel assembly comprising a center bearing, a member carrying the center bearing, said member being mounted for rotation on the trailer frame on a horizontal axis transverse to said frame, and a king-pin projecting from said center bearing, said king-pin being permanently disposed perpendicular to said center bearing.

HOMER F. FELLOWS.